United States Patent [19]

Kraemer et al.

[11] Patent Number: 4,686,596
[45] Date of Patent: Aug. 11, 1987

[54] RECORDING HEAD CORE YOKE AND METHOD OF MANUFACTURE

[75] Inventors: John C. Kraemer, Oakdale, Minn.; Paul R. Iverson, St. Croix Falls, Wis.

[73] Assignee: Minnesota Mining and Manufacturing Company, St. Paul, Minn.

[21] Appl. No.: 749,938

[22] Filed: Jun. 27, 1985

[51] Int. Cl.$^4$ ............................ G11B 5/16; G11B 5/22
[52] U.S. Cl. ..................................... 360/126; 360/122; 360/123
[58] Field of Search .............................. 360/125–127, 360/119–121, 122, 123

[56] References Cited

U.S. PATENT DOCUMENTS 3,846,840 11/1974 Childers et al. ............... 360/118
4,300,179 11/1981 Barnes et al. ................. 360/127
4,313,143 1/1982 Zarr ............................. 360/106

Primary Examiner—John H. Wolff
Attorney, Agent, or Firm—Donald M. Sell; James A. Smith; David W. Anderson

[57] ABSTRACT

A support yoke for a video recording core having a narrow body portion and two wire-wound coils includes a narrow slot for supporting the body portion of the recording core between the coils and relief pockets formed on either side of the narrow slot to accommodate the wire-wound coils.

6 Claims, 4 Drawing Figures

RECORDING HEAD CORE YOKE AND METHOD OF MANUFACTURE

BACKGROUND OF THE INVENTION

1. Field of the Invention

The present invention relates to magnetic tape recorders and, particularly, to recorders adapted for multiple track recording using a single track head which is transversely movable with respect to the recording tape.

2. Description of the Prior Art

Data recording cartridges and recorders adapted for their use are disclosed and claimed in U.S. Pat. No. 3,692,255, issued to Von Behren. In the cartridge there disclosed, a magnetic recording tape is preloaded in a reel-to-reel type enclosure together with an endless flexible belt in frictional contact with the tape on both reel hubs for bi-directionally driving the tape, including rapid accelerations and decelerations, such as are encountered in digital data recording and playback.

U.S. Pat. No. 4,313,143 discloses a head positioning mechanism for a Von Behren cartridge which positions a recording head core transversely of the magnetic tape so that data may be recorded in a series of parallel tracks.

U.S. Pat. No. 4,300,179 further discloses a recording head core yoke which carries the recording head core and supports the magnetic tape transversely of its direction of movement with respect to the core. While the yoke of U.S. Pat. No. 4,300,179 has adequately performed its intended purpose, recent requirements for reduced recording track spacing has required the use of a smaller recording head core and has required greater lateral support for this core than is provided by the previous yoke.

SUMMARY OF THE INVENTION

Video recording cores which include a flat, rectangular body including two major surfaces, opposed ends, a curved upper edge and two wound-wire coils adjacent the ends have a size which has been found suitable to provide the parallel recording track densities now required. Suitable track densities, however, can only be realized if the video recording core is rigidly supported. Adequate support is also necessary because video recording cores are extremely fragile.

This support for the video recording core is provided according to the present invention by a supporting yoke which includes a bearing surface for supporting the recording tape transversely of tape movement, a thin slot disposed perpendicularly to the bearing surface for receiving the video recording core and stabilizing the core along its length, and support surfaces abutting the bearing surface which terminate adjacent the bearing surface slot to define relief pockets on either side of the slot for receiving the wound-wire coils associated with the video recording core.

The support yoke may be formed as a single molded or machined structure or, according to an alternate embodiment of the present invention, may be a laminate structure. The present invention also includes a method for forming such a laminated core which includes providing a flat, rectangular bearing plate having a continuous upper edge, providing two flat, rectangular support plates generally of the same dimensions as the bearing plate, forming relief slots in each of the support plates which open at an edge of the support plates, attaching the support plates to the bearing plate so that the support plate relief slots are aligned and adjacent the upper edge of the bearing plate with the bearing plate between the support plates, forming a mounting slot through the bearing plate and the support plates with the mounting slot being open at the bearing plate upper edge and centered within the support plate relief slots, rounding the upper edge of the bearing plate and the edges of the support plates containing the relief slots into a continuous curve matching that of the video recording core and mounting the video recording core into the mounting slots with the wound-wire coils contained within the support plate relief slots.

BRIEF DESCRIPTION OF THE DRAWINGS

The present invention will be more thoroughly described with reference to the accompanying drawings, wherein like numbers refer to like parts in the several views, and wherein.

DESCRIPTION OF THE PREFERRED EMBODIMENTS

Figure 1:
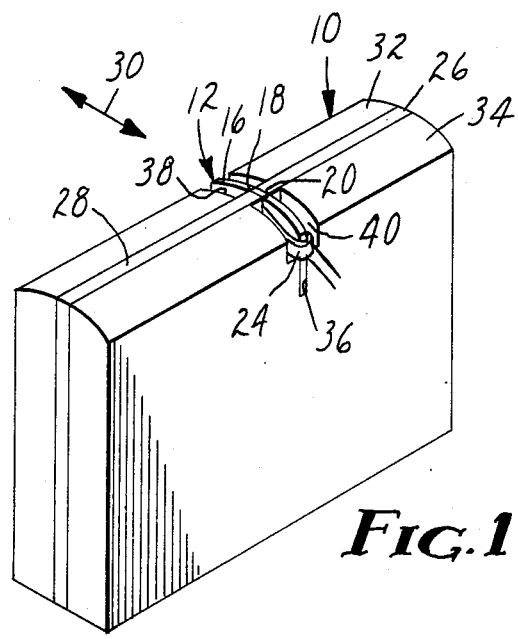
FIG. 1 is a perspective view of the preferred embodiment of a recording head core support yoke according to the present invention, with a recording head core assembled thereto.
Figure 3:
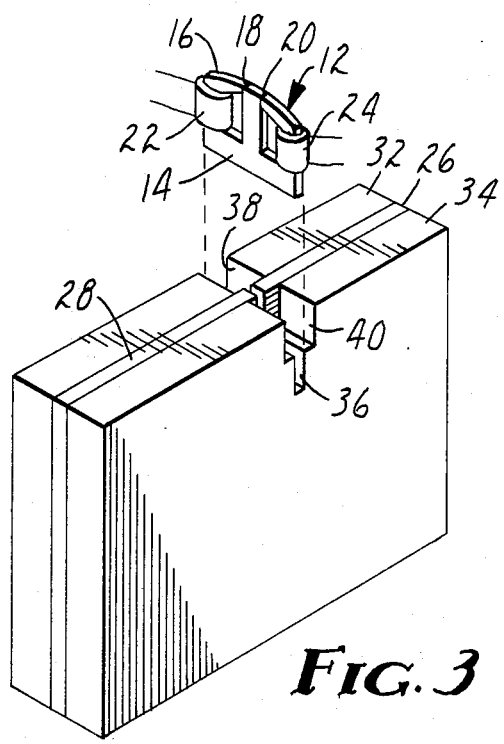
FIG. 3 is an exploded, perspective view of the support yoke of FIG. 1, prior to assembly of the recording head core to the support yoke.

FIG. 1 illustrates a recording head core support yoke, generally indicated as 10, which supports a video recording head core 12. As best seen in FIG. 3, the core is a single or dual-gap type utilized in the video recording arts and is conventional and familiar to those skilled in that art. The core 12 includes a flat, generally rectangular body portion 14 which includes two major surfaces, opposed ends and a curved upper edge 16. The upper edge 16 includes two magnetic gaps 18 and 20, one each for recording and reading or playing back recorded material. The body 14 of the recording core 12 is conventionally constructed of a magnetic ferrite such as a composition of manganese zinc ferrite or nickel zinc ferrite. The magnetic flux present at the gaps 18 and 20 is controlled by two wire-wound coils 22 and 24 which extend beyond the major surfaces of the core 12 and which are suitably connected to a recording machine (not shown).

Returning to FIG. 1, the preferred embodiment of the recording head core support yoke 10 is a laminated structure which includes a central bearing plate 26 which has an upper bearing surface 28. The support yoke 10 is intended to be used in a recorder such as that illustrated in U.S. Pat. No. 4,313,143 which positions the core 12 relative to a magnetic tape (not shown) which moves in the directions illustrated by the double-headed arrow 30. The core 12 and yoke 10, however, could be used with other magnetic recording media, such as discs.

The core 12 is moved transversely with respect to the direction of tape movement to record a series of spaced, parallel information tracks on the recording tape. Since the core 12 moves transversely with respect to the recording tape, the bearing surface 28 must have a length sufficient to provide support for the recording tape over its entire width. In order to accomplish this, the yoke 10 must extend in each direction from the core 12 a distance at least as wide as the recording tape itself. For example, if the tape were 8 mm wide, the distance from the core 12 to the edge of the yoke 10 must be at least 8 mm or, put another way, the overall length of the bearing surface 28 must be at least twice the width of the recording tape. It is anticipated that the core 12 may be positioned entirely off the recording tape, in which case one of the two sides of the yoke 10 must be slightly longer than the width of the recording tape.

To provide additional support for the recording tape, the support yoke 10 is provided with two support plates 32 and 34 which are bonded to each major surface of the bearing plate 26. These support plates 32 and 34 more completely support the recording tape and increase the structural rigidity of the assembly.

The bearing plate 26 and the support plates 32 and 34 are preferably formed of a ceramic material such as barium titanate or calcium titanate and are bonded to each other either with an epoxy material or a glass bond.

To accommodate the recording core 12, the bearing plate 26 and the support plates 32 and 34 are provided with a narrow slot 36 which closely accommodates the recording core 12 and supports the core 12 along its lower edge and its entire length between the wire-wound coils 22. The narrow slot 36 extends completely to the bearing surface 28 of the bearing plate 26 and, thus, lateral support is provided throughout the entire length of the core 12. Adjacent the bearing plate 26, the support plates 32 and 34 are provided with relief pockets 38 and 40, respectively, which accommodate and provide clearance for the wire-wound coils 22. Finally, the bearing surface 28 and the adjacent upper surfaces of the support plates 32 and 34 are rounded to conform to the upper edge 16 of the recording core 12 to eliminate any sharp edges which might abrade or otherwise damage the recording tape. The core 12 preferably projects approximately 0.03 mm above the bearing surface 28 to ensure adequate contact between the core 12 and the recording tape, and, although a variety of material may be used to construct the support yoke 10, a ceramic is preferred to resist wear and it is desirable that this ceramic have wear characteristics which cause the yoke 10 to wear slightly faster than the core 12, to ensure that the core always protrudes.

Figure 2:
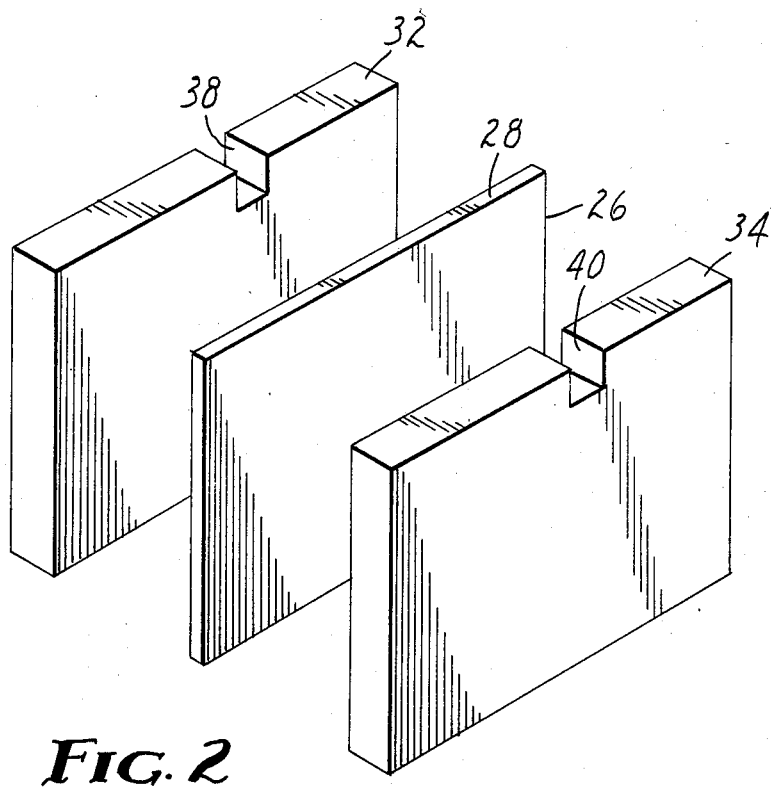
FIG. 2 is an exploded, perspective view of the support yoke of FIG. 1.

FIGS. 2 and 3 illustrate a preferred method of manufacturing the laminated support yoke 10 of FIG. 1. As seen in FIG. 2, the method comprises the steps of providing a flat, rectangular bearing plate 26 having a continuous upper edge which defines a bearing surface 28; providing two flat, rectangular support plates 32 and 34 which are generally of the same dimensions as the bearing plate 26; forming relief slots or pockets 38 and 40 in each of the support plates 32 and 34, which slots 38 and 40 open at the edge of the support plates 32 and 34 which are adjacent the bearing surface 28; attaching the support plates 32 and 34 to the bearing plate 26, as shown in FIG. 3, so that the support plate relief slots 38 and 40 are aligned and adjacent the bearing surface 28 of the bearing plate 26 with the bearing plate 26 between the support plates 32 and 34; forming a mounting slot 36 through the bearing plate 26 and the support plates 32 and 34 with the mounting slot 36 being open at the bearing surface 28 and centered within the support plate relief slots 38 and 40, and, as shown in FIG. 1, rounding the upper edge of the bearing plate 26 and the edges of the support plates 32 and 34 containing the relief slots 38 and 40 into a continuous curve matching that of the recording core 12. The recording core 12 is then mounted to the slot 36, preferably with an epoxy, to form the completed assembly shown in FIG. 1.

The dimensions of the relief slots 38 and 40 are not critical since they merely provide clearance for the wire-wound coils 22. Therefore, these slots 38 and 40 may be formed by many methods such as machining, etching or even molding, if a fine-grained, moldable ceramic such as Dow Chemical Photoceram ®, is utilized. The narrow support slot 36, however, must support the length of the core 12 and, therefore, must be accurately cut with a very close tolerance to the thickness dimension of the core 12, typically 0.01 mm. Accurate machining is the preferred method of forming the narrow slot 36 in the bearing plate 26 and the support plates 32 and 34.

The depth, however, of the slot 36 is not as critical as its width, and it may be desirable to cut the narrow slot 36 to a deeper depth than is required to accommodate the recording core 12 in order that a wire or similar tool may be inserted into the slot 36 below the recording core 12 to facilitate positioning of the core 12 as it is attached to the yoke 10.

Figure 4:
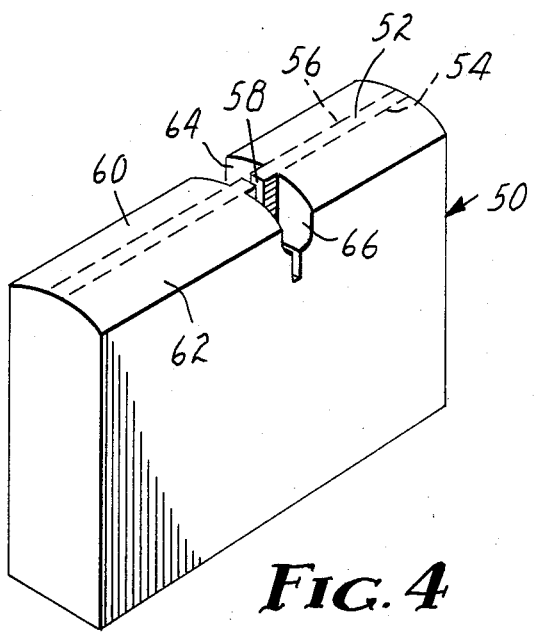
FIG. 4 is a perspective view of an alternate embodiment of a support yoke.

FIG. 4 illustrates an alternate embodiment of a support yoke 50 which is formed from a single block of material such as aluminum. If aluminum is utilized, it may be "hard-coated" by controlled oxidation to produce adequate wear properties. Although the yoke 50 of FIG. 4 is a continuous block, it may be thought of as comprising a central bearing surface 52 which lies between two phantom lines 54 and 56. A thin slot 58 is cut in the approximate center of the length of this bearing surface 52 and is utilized to support the entire length of the recording core 12. Adjacent the bearing surface 52 are two abutting support surfaces 60 and 62 which terminate adjacent the thin slot 58 to define relief pockets 64 and 66 for receiving the wire-wound coils 22 associated with the recording core 12. The thin slot 58 and the relief pockets 64 and 66 may be cut in either order, so long as particular attention is paid to the width of the slot 58 for the reasons described above. The support yoke 50 of FIG. 4 has been shown to operate satisfactorily, but the laminated structures of FIGS. 1-3 is more desirable since it is preferable to form the support yoke 10 of a ceramic material. Ceramic materials are not as easily machined as metals and, therefore, it is very difficult to fashion a support yoke 10 from a solid block of ceramic material while retaining the dimensional accuracy required.

Although the present invention has been described with respect to only a limited number of embodiments, it is recognized that many modifications will be apparent to those skilled in the art. For example, the upper surfaces of the yoke 10 and the core 12 could be left flat and the relief slots or pockets 38 and 40 or 64 and 66 could extend to any depth beyond that necessary to accommodate the wire-wound coils 22. Also, it may be desirable to provide a support yoke 10 or 50 with more than one recording core 12. A construction with multiple cores 12 would be useful in testing recording tape since a number of separate tracks could be recorded simultaneously. All such modifications which fall within the spirit and scope of the appended claims are intended to be included within the present invention.

We claim:

1. A yoke for supporting in proximity to a moving recording medium at least one video recording core including a flat, generally rectangular body having two major surfaces, two ends, a curved edge, a second edge opposite said curved edge and two wound-wire coils adjacent said ends which extend beyond said major surfaces, said yoke comprising a generally rectangular block having:
   an edge defining a bearing surface for supporting a said recording medium transversely of medium movement;
   a thin slot disposed perpendicularly to said bearing surface for receiving a said video recording core and stabilizing a said core along substantially its entire length from said curved edge to said second edge; and
   two relief pockets each extending from each of said major surfaces of said block less than one-half the dimension of said block between said major surfaces and open at said bearing surface adjacent said slot for receiving said coils associated with a said recording core.

2. A yoke according to claim 1 wherein said bearing surface is rounded into a continuous curve.

3. A yoke according to claim 1 further including a multiplicity of said thin slots spaced along said bearing surface and a multiplicity of associated relief pockets, said slots and said relief pockets receiving and stabilizing a multiplicity of video recording cores.

4. A laminated yoke adapted to support in proximity to a moving recording medium a video recording core including a flat, generally rectangular body having two major surfaces, two ends, a curved edge, a second edge opposite said curved edge and two wound-wire coils adjacent said ends which extend beyond said major surfaces, said laminated yoke comprising:
   a bearing plate having two major surfaces and an edge defining a bearing surface for supporting a said recording medium transversely of medium movement;
   a mounting slot extending through said bearing plate and opening at said bearing surface for receiving a said video recording core and stabilizing said major surfaces of said recording core body between said coils along substantially the entire length of said major surfaces of said recording core body between said curved edge and said second edge; and
   two support plates bonded one to each of said major surfaces of said bearing plate, each said support plate including a relief slot extending on either transverse side of said mounting slot to accommodate a said recording core coil.

5. A yoke according to claim 4 wherein said bearing surface and said support plates adjacent said bearing surface are rounded into a continuous curve.

6. A yoke according to claim 4 further including a multiplicity of said thin slots spaced along said bearing surface and a multiplicity of relief slots associated with each of said thin slots, said thin slots and said relief slots receiving and stabilizing a multiplicity of video recording cores.

* * * * *